United States Patent
Kandregula et al.

(10) Patent No.: US 7,567,942 B2
(45) Date of Patent: Jul. 28, 2009

(54) INTELLIGENCE ENGINE SOFTWARE ARCHITECTURE

(75) Inventors: Anil K. Kandregula, Richardson, TX (US); Michael David Hall, Carrollton, TX (US); BalaSubrahmanyam Gattu, Richardson, TX (US); Kong P. Bhat, Plano, TX (US); Gary F. Parks, Mesquite, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 11/550,714

(22) Filed: Oct. 18, 2006

(65) Prior Publication Data

US 2008/0189227 A1 Aug. 7, 2008

(51) Int. Cl.
*G06F 7/16* (2006.01)
(52) U.S. Cl. .......................... 706/10; 706/22
(58) Field of Classification Search .............. 706/10, 706/20, 22
See application file for complete search history.

(56) References Cited

U.S. PATENT DOCUMENTS 6,961,334 B1 11/2005 Kaczmarczyk
2005/0228763 A1* 10/2005 Lewis et al. ............... 706/1

OTHER PUBLICATIONS

Hayes-Roth et al., A Domain-Specific Software Architecture for Adaptive Intelligent Systems, 1995.*
Cisco Systems® Data Sheet, "Cisco CNS 2100 Series Intelligence Engine," 1992-2003, Cisco Systems, Inc., 2 pgs.
"Cortical Software Re-Use Project," Computational Cognitive Modeling Research Group, Ireland, http://cortex.cs.nuim.ie/research/csru.html, Dec. 27, 2007, 3 pgs.
George, Dileep, et al., "A Hierarchical Bayesian Model of Invariant Pattern Recognition in the Visual Cortex," Department of Electrical Engineering Stanford University and Redwood Neurosciences Institute, Menlo Park, CA, http://www.stanford.edu/~dil/invariance/Download/GeorgeHawkinsIJCNN05.pdf, Jan. 3, 2008, 6 pgs.
Memex Product Sheet, "Memex Intelligence Engine™," http://www.memex.com/docs/memexintelligenceengine_productsheet.pdf, Jan. 3, 2008, 2 pgs.

(Continued)

*Primary Examiner*—David R Vincent
*Assistant Examiner*—Nathan H Brown, Jr.

(57) ABSTRACT

An intelligence engine software architecture is disclosed. The architecture consists of a sensor layer, a knowledge processing layer, and an intelligence layer. The sensor layer can receive input data from a plurality of domains and convert the input data into a domain-independent format. The knowledge processing layer can identify a pattern in the domain-independent data and compare the domain-independent data to a previously identified pattern. The intelligence layer can make a prediction based on the comparison of the domain-independent data to the previously identified pattern, the intelligence layer is further operable to issue reports, events, and other information of interest to an operator.

20 Claims, 3 Drawing Sheets

OTHER PUBLICATIONS

Pivotal Corporation Technical White Paper, "Pivotal Intelligence Engine™: Technology Overview," 2001, 27 pgs. + cover page, copyright page, and table of contents.

Reilly, Ronan G., et al., "Cortical Software Re-Use: A Computational Principle for Cognitive Development in Robots," Department of Computer Science, National University of Ireland—Kildare and University College Dublin, http://www.coneural.org/goga/papers/GogaReilly2002MIT.pdf, Jan. 3, 2008, 6 pgs.

Bhat; "Loose Pattern Identification Using a Smart Multiset Intersection Approach"; U.S. Appl. No. 11/754,185, filed May 25, 2007; Specification 32 pgs.; 8 Drawing Sheets (Figs. 1-5).

* cited by examiner

INTELLIGENCE ENGINE SOFTWARE ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD

The present disclosure is directed to software architecture, and more particularly, but not by way of limitation, to a system and method for providing an improved level of intelligence in computing systems.

BACKGROUND

Several attempts have been made to create intelligent software systems. One branch in the field of intelligent software is known as artificial intelligence (AI). AI attempts to create intelligent systems by emulating human behavior with computers having sufficient memory and processing power. Although there have been some minor successes at emulating human behavior, AI has not lived up to its expectations since it fails to adequately address what intelligence is or what true learning means.

Another type of intelligent software is known as an expert system. Expert systems, which can be considered a branch of AI, use a knowledge base of if/then/else rules and an engine to execute the rules. These systems can automate a lengthy decision-making process that deals with a large quantity of data by using the rules to sift through the data. Expert systems are currently used in medicine, business, air traffic control, banking, science, and other domains. However, expert systems are limited to domains where lists of rules are well known and can be correctly programmed. As such, expert systems typically perform no reasoning beyond the rule execution and are not able to transfer knowledge from one domain to another.

Neural networks are a small improvement over the AI approach. Neural network software architectures are based on neuron connections within the human brain. A neural network's information is distributed throughout its nodes, where each node can represent a neuron in an actual brain. Neural networks have been employed in limited form in a few applications such as speech recognition, optimizations, and image processing. Neural networks fail to embody true intelligence since their architecture is focused on how neurons behave when connected rather than on how real learning occurs in the brain.

These previous attempts at creating intelligent software systems have tended to rely on reactive programming. That is, computation is done at run time as data is received and actions are then taken based on the run time calculations. There is typically no anticipation of likely future events to aid in the selection of appropriate actions.

SUMMARY

In one embodiment, an intelligence engine software architecture is provided. The architecture consists of a sensor layer, a knowledge processing layer, and an intelligence layer. The sensor layer can receive input data from a plurality of domains and convert the input data into a domain-independent format. The knowledge processing layer can identify a pattern in the domain-independent data and compare the domain-independent data to a previously identified pattern. The intelligence layer can make a prediction based on the comparison of the domain-independent data to the previously identified pattern, the intelligence layer is further operable to issue reports, events, and other information of interest to an operator, such as in response to a condition being met.

In another embodiment, a method for making a prediction based on an input of data is provided. The method consists of filtering extraneous data from the input of data, converting the filtered data into a domain-independent format, analyzing the domain-independent data to identify a pattern, storing an identified pattern in a knowledge base, comparing the domain-independent data to a stored pattern in the knowledge base, and making the prediction based on the comparison of the domain-independent data to the stored pattern.

In another embodiment, a software engine is provided. The software engine consists of a sensor layer, a knowledge processing layer, and an intelligence layer. The sensor layer can receive input data from a plurality of domains and convert the input data into a domain-independent format. The sensor layer comprises a filtering module that can remove extraneous data from the input data and an adaptation module that can convert the input data into the domain-independent format. The knowledge processing layer comprises a learning module that can identify a pattern in the domain-independent data, a classification module that can compare the domain-independent data to a previously identified pattern, and a prediction module that can make a prediction based on the comparison of the domain-independent data to the previously identified pattern. The intelligence layer can make a final prediction.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The intelligence engine software architecture described herein embodies real intelligence by deriving its fundamental principles from the anatomy of the neocortex. Cortical design techniques such as a multi-layer hierarchical architecture, sensory input, learning of patterns from real world input, pattern aggregation, feedback, feed forward, source tracking, and a hierarchical memory model are combined with advanced mathematical algorithms to develop a generic and advanced intelligence engine. Patterns are identified in historical data and the knowledge gained from the patterns is applied to run time data.

Since this architecture is generic in nature, it can be deployed in several domains with only minimal changes to a data input layer. The applications of this intelligence engine software architecture are broad and can include ubiquitous networks; smart homes; handset personalization; image recognition; visual security; biometrics; intelligent and proactive operations, administration, and management (OAM); cognitive radio spectrum management; context-aware mobility management; gesture recognition; social networks; prediction of user preferences and actions; and other applications.

Figure 1:
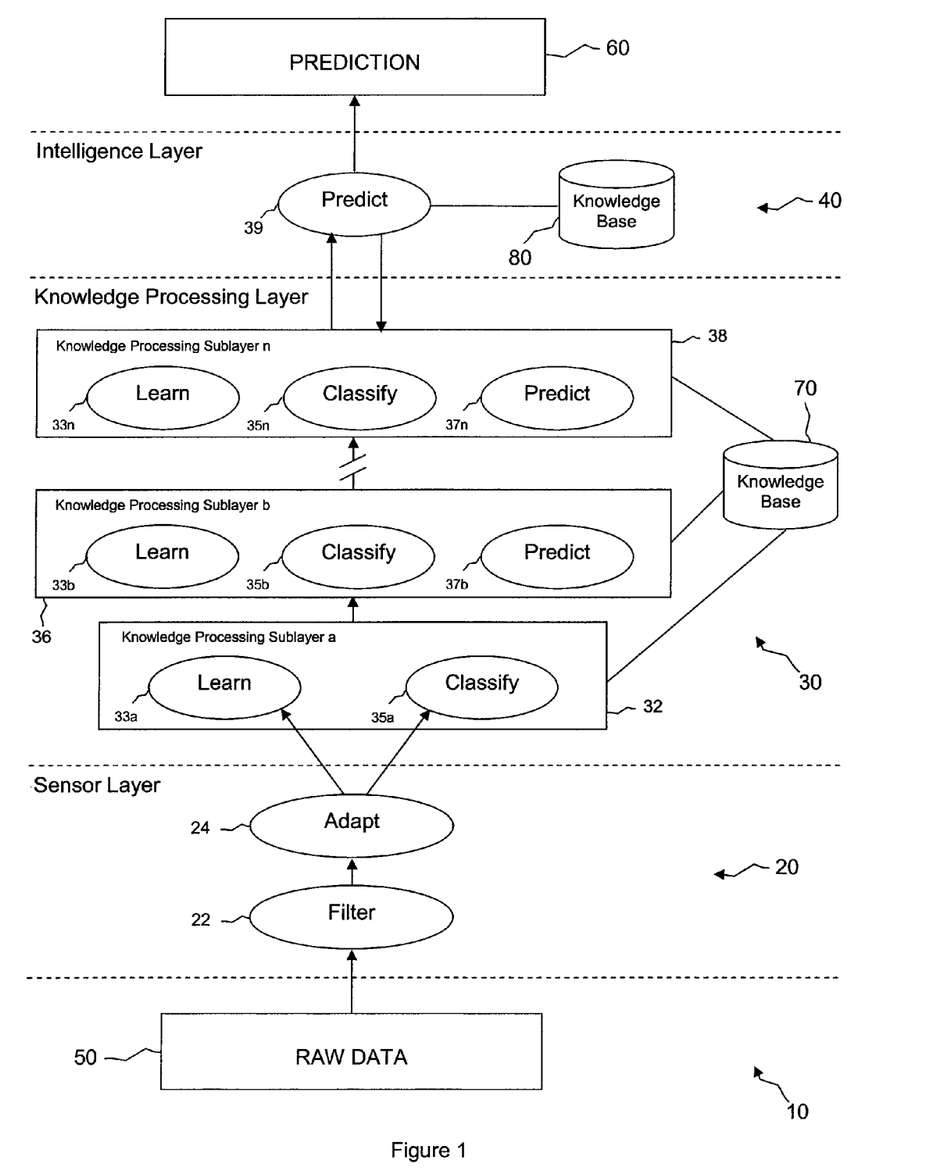
FIG. 1 is a diagram of an intelligence engine software architecture according to an embodiment of the disclosure.

FIG. 1 illustrates an embodiment of an intelligence engine software architecture 10. The architecture 10 contains three layers: a sensor layer 20, a knowledge processing layer 30, and an intelligence layer 40. The sensor layer 20 is capable of collecting raw, real-world data 50 from a variety of domains or environments. The sensor layer filters the data 50, adapts the data 50 into a generic format, and sends the adapted data to the knowledge processing layer 30. The knowledge processing layer 30 identifies patterns in the adapted data and compares further data inputs to the identified patterns. The knowledge processing layer 30 then passes the results of the comparisons to the intelligence layer 40. The intelligence layer 40 can make a prediction 60 about a future event based on the comparisons of the data to the patterns.

The sensors used to collect the data 50 are specific to the type of domain from which the data 50 comes. For example, in a ubiquitous network, the sensors may consist of a collection of network sensors performing motion tracking. In a wireless telecommunications network, the sensors may consist of a collection of radio frequency access points performing call processing. In a handset personalization scenario, the sensors may consist of a collection of cell phones allowing subscribers access to the services network. In an intelligent OAM deployment, the sensors may consist of a collection of sensors in the network elements collecting alarms, performance threshold crossing alerts, operator commands, and other events.

Data 50 collected by the sensors is injected into a filtering module 22 within the sensor layer 20. The filtering module 22 removes extraneous, unwanted, or spurious data from the raw data 50. Rules for specifying which data is to be removed by the filtering module 22 are specific to the domain from which the raw data 50 was derived. The rules can be preconfigured or can be learned over time. Upon receipt of the input data 50, the filtering module 22 enforces the rules for removing extraneous data, discards the extraneous data, and sends the remaining data to an adaptation module 24 within the sensor layer 20.

The adaptation module 24 converts the domain-specific filtered data into a domain-independent format that allows the subsequent portions of the intelligence engine 10 to be generic and usable across a wide range of intelligence applications. For example, in an intelligent OAM deployment, the adaptation module 24 might convert the various alarms, performance threshold crossing alerts, operator commands, and similar other data into unique integers. In a telecommunications network deployment, the adaptation module 24 might convert various indicators of the status of the network into a different set of integers. The subsequent portions of the intelligence engine 10 would then operate on the integers rather than on the domain-specific data.

This ensures that the rest of the intelligence engine 10 has no knowledge of the domain-specific data 50 and thus fosters reuse across several domains. If the intelligence engine 10 is to be deployed in different domains, only the sensor layer 20 needs to modified as appropriate for each domain; the knowledge processing layer 30 and the intelligence layer 40 can remain the same.

The adapted data produced by the adaptation module 24 is passed to the knowledge processing layer 30. Since the adaptation module 24 converts the raw data 50 into a generic format, the knowledge processing layer 30 can treat the adapted data in a sensor-independent manner. The knowledge processing layer 30 typically includes a plurality of sublayers. The number of sublayers might depend on the type and complexity of the data 50 upon which the intelligence engine 10 is acting, the type and number of sensors used to collect the data 50, the type of data abstraction needed, and/or other factors.

In an embodiment, the adapted data is passed to a first knowledge processing sublayer 32, which includes a learning module 33a and a classification module 35a. The learning module 33a analyzes the adapted data and attempts to identify patterns in the adapted data. That is, the learning module 33a attempts to determine whether any sequences of data elements appear frequently in the adapted data or whether any data elements in the adapted data tend to appear near one another, but not necessarily in a consistent sequence.

The learning module 33a identifies patterns and develops statistics for different instances of an entity and then tries to aggregate the instance patterns into a pattern for the entity. In a telecommunications network application, examples of the different types of entities might include a base transceiver station (BTS), a base station controller (BSC), a packet data serving node (PDSN), and a mobile switching center (MSC). Different instances of a BTS in a network might be referred to as BTS-1, BTS-2, etc. When knowledge is gained about a large number of instances of an entity, that knowledge might be applied to all instances of that entity. Knowledge gained about one entity cannot necessarily be applied to other entities, however. For example, knowledge about a BTS would not necessarily apply to a BSC.

It may also be possible that two different instances of an entity exhibit different patterns, but that the two patterns result in identical outcomes. The learning module 33a can attempt to find commonalities between the patterns or to identify an aggregated pattern that includes both of the different patterns.

The learning module 33a updates a knowledge base 70 with any patterns it finds and performs continuous updates to the pattern knowledge base 70 as more patterns are learned during run time. The learning module 33a might also generate basic statistical information about the patterns such as counts and timing data for the patterns and the elements in the patterns. This statistical information might also be stored in the knowledge base 70.

In addition to sending adapted data to the learning module 33a, the adaptation module 24 also sends adapted data to the classification module 35a. The classification module 35a attempts to determine whether any of the patterns stored in the knowledge base 70 are present in the adapted data. That is, the classification module 35a attempts to classify the events that appear to be happening in a given domain based on the inputs it receives from the domain and on knowledge in the knowledge base 70. At times, the recognition of patterns in the adapted data might consist of a simple search through the adapted data for a particular sequence of data elements. At other times, the adapted data might contain only partial information and the classification module 35a might need to undertake a more sophisticated pattern recognition procedure. For example, the classification module 35a might employ a Bayes classification technique or other advanced mathematical techniques. The classification module 35a classifies the input at both the entity and instance levels and ensures that data from different instances or different entities is not mixed prior to classification.

As an example, the data element sequence "ABC" might be identified as a pattern and stored in the knowledge base 70. If the adapted data contains the sequence "AC", the classification module 35a might perform an analysis to determine whether "AC" is actually an instance of the pattern "ABC", but an instance in which only a portion of the pattern has been detected. In other words, the classification module 35a classifies the data received from the adaptation module 24 by deducing the highest probability of a match between the partial data and known patterns.

The classification module 35a then aggregates the patterns it has deduced into higher-level patterns. For example, if it has been found historically that the pattern "ABC" leads to data element "D", "ABCD" could be considered a higher-level pattern. The classification module 35a might classify "ABCD" as pattern "X". This aggregation of patterns might take place strictly within the classification module 35a or might occur in conjunction with higher sublayer classification modules 35.

After processing a portion of the adapted data, the first knowledge processing sublayer 32 might pass the processed data to a second knowledge processing sublayer 36. Similar to the first knowledge processing sublayer 32, the second knowledge processing sublayer 36 includes a learning module 33b and a classification module 35b. As in the sublayer 32, the learning module 33b identifies patterns in the data it receives and the classification module 35b analyzes the data it receives to determine if a pattern identified by the learning module 33b can be found.

In addition to the learning module 33b and the classification module 35b, the second knowledge processing sublayer 36 includes a prediction module 37b. In an embodiment, the classification module 35a within the first knowledge processing sublayer 32 informs the prediction module 37b within the second knowledge processing sublayer 36 of the patterns it has deduced. The prediction module 37b then makes predictions of likely future patterns based on the patterns received from the classification module 35a. The prediction module 37b tracks and maintains its input at the entity level and at the instance level. The prediction module 37b might employ advanced mathematical solutions such as the nth order Markov model, the all-kth Markov model, the selective Markov model, the hidden Markov model, and/or other algorithms to make its predictions.

In an embodiment, the prediction module 37b sends the predictions to the lower layer classification module 35a as feedback. The classification module 35a might then refine its pattern classifications based on the feedback received from the higher layer prediction module 37b. In a feed forward process, the classification module 35a might then inform the higher layer prediction module 37b of the refined pattern classifications. The classification module 35a might also inform the prediction module 37b of its confidence level in the classifications.

In this way, information about events that are expected to happen flows downward as feedback and information about events that are actually happening is sent upward as feed forward. This iterative feedback and feed forward process allows patterns to be deduced with only partial data and allows intelligent predictions to be made. The feedback and feed forward between the classification module 35a and the prediction module 37b might continue through multiple iterations with the classification module 35a refining its classifications and the prediction module 37b refining its predictions with each iteration.

After processing a portion of the data received from the first knowledge processing sublayer 32, the second knowledge processing sublayer 36 might pass its processed data to a higher level knowledge processing sublayer 38. The higher level knowledge processing sublayer 38 contains a learning module 33n to identify patterns in the data it receives, a classification module 35n to analyze the data it receives to determine if a pattern can be found, and a prediction module 37n to predict future events based on the patterns found by the classification module 35n.

Data might continue to be processed in this manner and passed to higher level knowledge processing sublayers until knowledge processing is complete. That is, while three sublayers are shown in the knowledge processing layer 30 in FIG. 1, other numbers of sublayers could be present. In general, complex data that requires a great deal of aggregation would typically require a greater number of sublayers in the knowledge processing layer 30. The repeating of this processing across multiple sublayers allows for reported patterns to become more and more coarsely grained as they move up the hierarchy. The aggregation of patterns might occur within a single sublayer or might occur each time a set of patterns moves up the hierarchy.

In a case where the raw data 50 is not complex, only one knowledge processing sublayer might be present and might include the learning module 33, the classification module 35, and the prediction module 37. In this case, feedback and feed forward between the classification module 35 and the prediction module 37 would occur within the single knowledge processing sublayer.

A set of related learning 33, classification 35, and prediction 37 modules within a single sublayer can be referred to as a node. While only one node is shown in each sublayer in FIG. 1, several nodes might actually be present in each sublayer. Several nodes at a lower sublayer might send information to a single prediction module 37 at a higher sublayer and the single prediction module 37 might make a prediction based on input from the multiple lower layer sublayer nodes. Thus, the number of nodes in each sublayer tends to decrease as information moves upward through the intelligence engine 10 and as patterns become more aggregated and coarsely grained.

Each sublayer 32, 36, and 38 operates on the knowledge base 70, storing learned patterns, timing events, and supportive data, and retrieving stored patterns for comparison with incoming data. While FIG. 1 shows only one knowledge base 70 being used by all of the sublayers 32, 36, and 38, in other embodiments each sublayer 32, 36, and 38 might operate on a separate knowledge base 70.

When processing in the knowledge processing layer 30 is complete, data is passed to the intelligence layer 40, the topmost layer of the intelligence engine 10. The intelligence layer 40 includes a prediction module 39 similar to the prediction modules 37 at the knowledge processing layer 30. The prediction module 39 receives data processed by the knowledge processing layer 30 and produces a prediction based on this data. The prediction module 39 might then inform one of the classification modules 35 of the prediction. In a process similar to that described above, the classification module 35 might then use the prediction as feedback to refine its classifications. The classification module 35 can inform the prediction module 39 how accurate the prediction is and the prediction module 39 can then use that information as feed forward to refine its prediction.

The feedback and feed forward might continue until a calculated probability of the prediction being correct is beyond a pre-specified threshold value. The prediction module 39 might then issue an external prediction report 60 that might include the type, source, time, and probability of the event. The external prediction report 60 might be sent to an operator or to an automated system that can take an action based on the report 60. For example, in a network operations scenario, the prediction module 39 might issue a prediction 60 to a network operator that a fault in a particular network element is likely to occur.

The intelligence layer 40 might have a separate knowledge base 80 for storing and retrieving patterns. Alternatively, the intelligence layer 40 might use the same knowledge base 70 used by the knowledge processing layer 30.

The architecture 10 promotes a proactive approach to the processing of input data by anticipating future events and preparing actions based on the likelihood of the future events. This can be contrasted with previous systems where processing is done reactively at run time. The architecture 10 also allows predictions about the future to be made based on partial input, which is closer to true intelligence.

Figure 2:
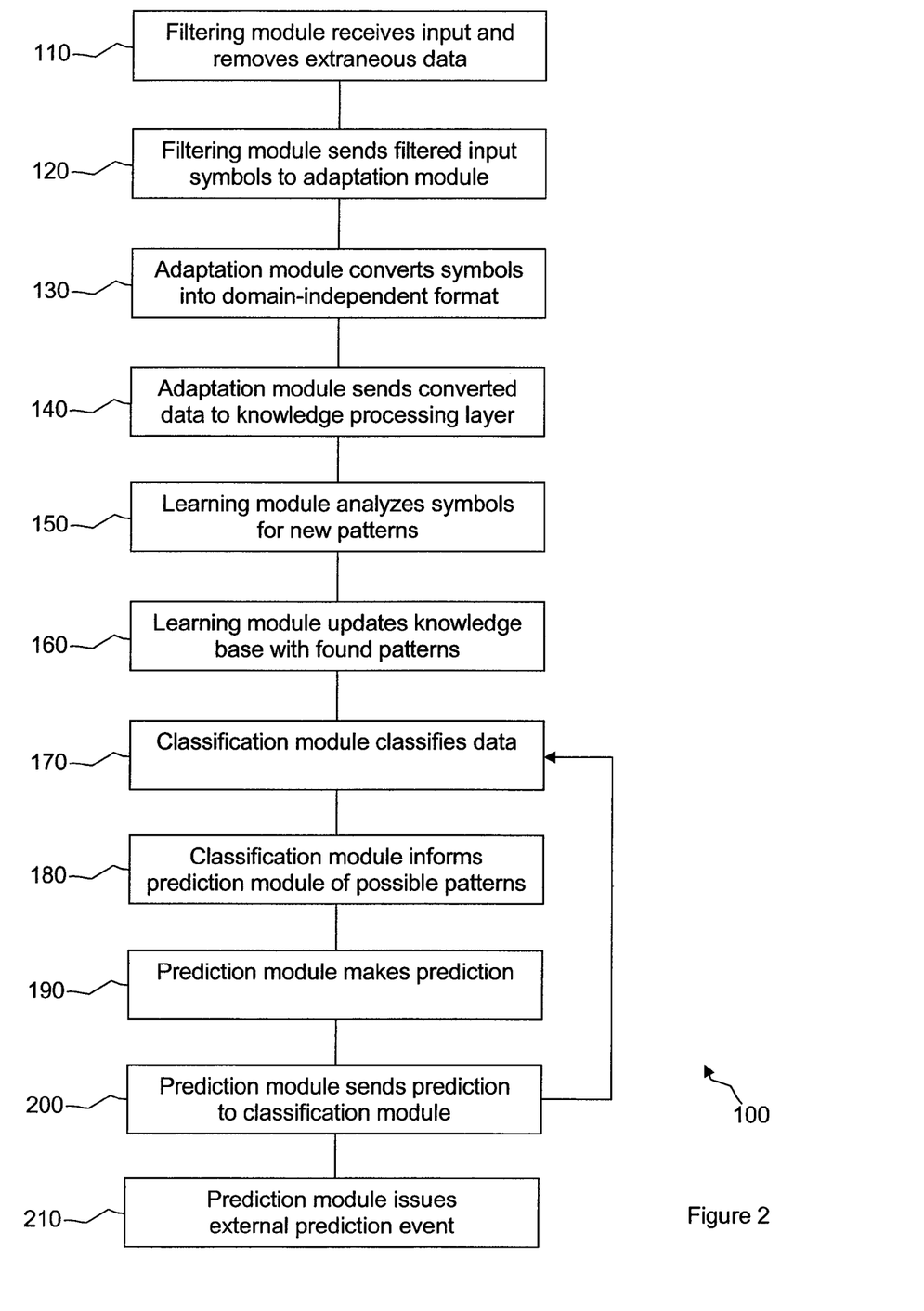
FIG. 2 is a diagram of a method for making a prediction based on an input of data according to an embodiment of the disclosure.

FIG. 2 illustrates a method 100 for making a prediction based on an input of data. In box 110, a filtering module in a sensor layer of an intelligence engine receives input data in the form of one or more input symbols and removes extraneous data from the input. In box 120, the filtering module sends the filtered input symbols to an adaptation module in the sensor layer. In box 130, the adaptation module converts the filtered input symbols into converted symbols that have a domain-independent format. In box 140, the adaptation module sends the converted symbols to a knowledge processing layer.

In box 150, a learning module in the knowledge processing layer receives the converted symbols and analyzes the symbols to find any new potential patterns. In box 160, if any potential new patterns are found, the learning module updates a knowledge base with the potential new patterns. In box 170, a classification module in the knowledge processing layer also receives the converted symbols. The classification module updates a count of the converted symbols and a conditional probability matrix of patterns in the knowledge base. The classification module classifies the converted symbols in the input buffer using a classification algorithm.

In box 180, based on a context received from a prediction module at a higher level, the classification module informs the prediction module that a probable pattern exists and the confidence level that a pattern exists. In box 190, the prediction module receives the pattern information from the classification module and updates a symbol transition matrix and a pattern probability value in the knowledge base. Based on learned knowledge and on the input received from the classification module, the prediction module makes a prediction of future anticipated patterns. In box 200, the prediction module sends the prediction to the lower layer classification module as context.

The actions taken in boxes 170, 180, 190, and 200 might be repeated to generate more accurate predictions. That is, after the prediction module makes a prediction, the prediction module might send the prediction as feedback to a classification module at a lower layer. The lower layer classification module might then use the prediction to refine its classifications and send the refined classifications as feed forward to the prediction module. The prediction module might then use the refined classification to make a further refined prediction. This feedback and feed forward process might continue through multiple iterations.

In box 210, if one or more of the predicted patterns happen to be of interest to an operator and if the prediction probability is greater than a pre-specified value, the prediction module issues an external prediction event describing the predicted pattern and a probable time the predicted event will occur.

Figure 3:
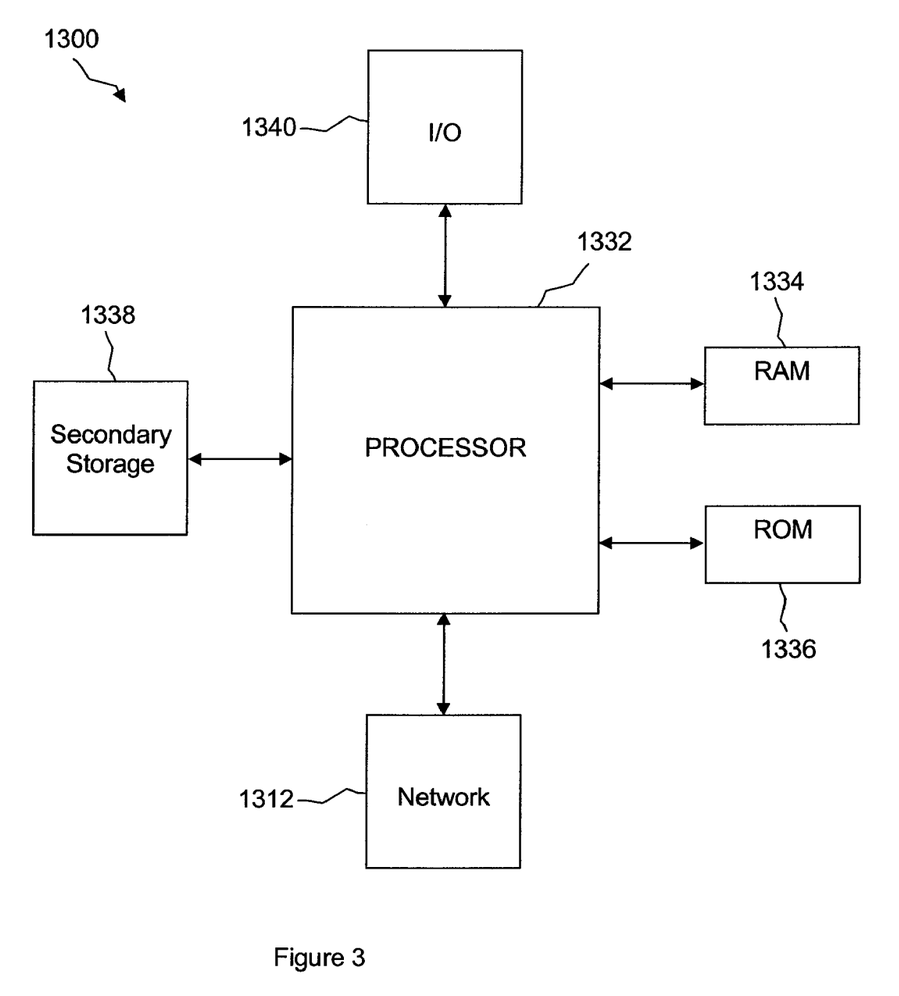
FIG. 3 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system, comprising:
   a sensor layer operable to receive input data from a plurality of domains and convert the input data into a domain-independent format, wherein the sensor layer comprises at least one physical sensor capable of collecting data from at least one environment;
   a knowledge processing layer operable to identify a pattern in the domain-independent data and further operable to compare the domain-independent data to a previously identified pattern, wherein the knowledge processing layer comprises at least one data processor used to identify the pattern in the domain independent data, and wherein the processor determines the highest probability of a match between the at least some of the domain independent data and known patterns;
   an intelligence layer operable to make a prediction based on the comparison of the domain-independent data to the previously identified pattern; and
   an output module capable of storing the prediction on a computer readable medium.

2. The system of claim 1, wherein the sensor layer comprises a filtering module operable to remove extraneous data from the input data and an adaptation module operable to convert the input data into the domain-independent format.

3. The system of claim 1, wherein the knowledge processing layer comprises a learning module operable to identify the pattern in the domain-independent data, a classification module operable to classify a high level pattern from the domain-independent data, and a prediction module operable to make the prediction based on the comparison of the domain-independent data to the previously identified pattern.

4. The system of claim 3, wherein the knowledge processing layer comprises a plurality of sublayers, each sublayer comprising an instance of the learning module, an instance of the classification module, and an instance of the prediction module.

5. The system of claim 4, wherein a lower sublayer classification module is operable to send classification information to a higher sublayer prediction module, the higher sublayer prediction module is operable to make a preliminary prediction based on the classification information, the higher sublayer prediction module is operable to send the preliminary prediction to the lower sublayer classification module, the lower sublayer classification module is operable to make a refined classification based on the preliminary prediction, the lower sublayer classification module is operable to send the refined classification to the higher sublayer prediction module, and the higher sublayer prediction module is operable to make a refined prediction based on the refined classification.

6. The system of claim 5, wherein the lower sublayer classification module is operable to continue the refinement of the classification and the higher sublayer prediction module is operable to continue the refinement of the prediction for a plurality of iterations, after which a final prediction is made.

7. The system of claim 6, further comprising an intelligence layer prediction module operable to make the final prediction when a calculated probability of the final prediction being correct is beyond a pre-specified threshold value.

8. The system of claim 1, further comprising a knowledge base operable to store the pattern identified by the knowledge processing layer and operable to be accessed by the knowledge processing layer to retrieve the pattern for comparison with the domain-independent data.

9. The system of claim 1, wherein the input data comprises at least one of:
   data related to management of a telecommunications network;
   data related to management of a computing network; and
   data related to image processing.

10. A method for making a prediction based on an input of data, comprising:
    filtering extraneous data from the input of data;
    converting the filtered data into a domain-independent format;
    analyzing the domain-independent data to identify a pattern, wherein analysis of the domain independent data uses at least one data processor used to identify the pattern in the domain independent data, and wherein the processor determines the highest probability of a match between the at least some of the domain independent data and at least one stored pattern in a knowledge base by;
    comparing the domain-independent data to the stored pattern in the knowledge base;
    making the prediction based on the comparison of the domain-independent data to the stored pattern and storing the prediction on a computer readable medium.

11. The method of claim 10, further comprising using the prediction to aid in performing an additional comparison of the domain-independent data to the stored pattern and making an additional prediction based on the additional comparison.

12. The method of claim 11, further comprising continuing to make the additional comparisons and the additional predictions until a calculated probability of the additional prediction being correct is beyond a pre-specified threshold value, whereupon a final prediction is issued.

13. The method of claim 10, wherein the input of data is received from at least one of:
   a telecommunications network; and
   a computing network.

14. A system, comprising:
   a sensor layer operable to receive input data from a plurality of domains and convert the input data into a domain-independent format, wherein the sensor layer comprises a filtering module operable to remove extraneous data from the input data and an adaptation module operable to convert the input data into the domain-independent format;
   a knowledge processing layer comprising a learning module operable to identify a pattern in the domain-independent data, wherein analysis of the domain independent data uses at least one data processor used to identify the pattern in the domain independent data,
   a classification module operable to compare the domain-independent data to a previously identified pattern, and a prediction module operable to make a prediction based on the comparison of the domain-independent data to the previously identified pattern;
   an intelligence layer operable to make a final prediction, wherein the final prediction is based upon the highest probability of a match between at least some of the domain independent data and the previously identified pattern; and
   an output module capable of storing the prediction on a computer readable medium.

15. The system of claim 14, wherein the knowledge processing layer comprises a plurality of sublayers, each sublayer comprising an instance of the learning module, an instance of the classification module, and an instance of the prediction module.

16. The system of claim 15, wherein a lower sublayer classification module is operable to send classification information to a higher sublayer prediction module, the higher sublayer prediction module is operable to make a preliminary prediction based on the classification information, the higher sublayer prediction module is operable to send the preliminary prediction to the lower sublayer classification module, the lower sublayer classification module is operable to make a refined classification based on the preliminary prediction, the lower sublayer classification module is operable to send the refined classification to the higher sublayer prediction module, and the higher sublayer prediction module is operable to make a refined prediction based on the refined classification.

17. The system of claim 16, wherein the lower sublayer classification module is operable to continue the refinement of the classification and the higher sublayer prediction module is operable to continue the refinement of the prediction for a plurality of iterations, after which the final prediction is made.

18. The system of claim 17, further comprising an intelligence layer prediction module operable to make the final prediction when a calculated probability of the final prediction being correct is beyond a pre-specified threshold value.

19. The system of claim 14, further comprising a knowledge base operable to store the pattern identified by the knowledge processing layer and operable to be accessed by the knowledge processing layer to retrieve the pattern for comparison with the domain-independent data.

20. The system of claim 14, wherein the input data comprises at least one of:
   operations, administration and management data for a telecommunications network;
   operations, administration and management data for a computing network;
   image recognition data;
   visual security data;
   biometrics data; and
   cognitive radio spectrum management data.

* * * * *